US008670887B2

(12) United States Patent
Nishimori et al.

(10) Patent No.: US 8,670,887 B2
(45) Date of Patent: Mar. 11, 2014

(54) VEHICLE AND METHOD FOR CONTROLLING VEHICLE

(71) Applicant: Honda Motor Co., Ltd., Tokyo (JP)

(72) Inventors: Takashi Nishimori, Shimotsuke (JP); Satoshi Andou, Utsunomiya (JP); Masayuki Kikuchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/851,434

(22) Filed: Mar. 27, 2013

(65) Prior Publication Data

US 2013/0261862 A1   Oct. 3, 2013

(30) Foreign Application Priority Data

Mar. 30, 2012   (JP) .................. 2012-081689

(51) Int. Cl.
*G06F 17/00* (2006.01)

(52) U.S. Cl.
USPC ............................. 701/22; 180/6.48

(58) Field of Classification Search
CPC ........................................ G06F 17/00
USPC ........................................ 180/6.48; 701/22
See application file for complete search history.

(56) References Cited

U.S. PATENT DOCUMENTS

| 4,754,834 A * | 7/1988 | Ozaki et al. ............... 180/233 |
| 4,874,056 A * | 10/1989 | Naito ...................... 180/233 |
| 5,540,299 A | 7/1996 | Tohda et al. |
| 6,917,869 B2 * | 7/2005 | Bastian et al. .................. 701/70 |
| 2004/0238244 A1 * | 12/2004 | Amanuma et al. ............. 180/65.2 |
| 2005/0228554 A1 * | 10/2005 | Yamamoto et al. .............. 701/22 |
| 2010/0250056 A1 * | 9/2010 | Perkins ........................... 701/35 |
| 2010/0300781 A1 * | 12/2010 | Leone ........................ 180/65.29 |
| 2011/0083919 A1 * | 4/2011 | Kshatriya ................... 180/65.26 |

FOREIGN PATENT DOCUMENTS

| JP | 06-166343 | 6/1994 |
| JP | 2010-236674 | 10/2010 |

OTHER PUBLICATIONS

Tahami et al. "A novel driver assist stability system for all-wheel-drive electric vehicles" Vehicular Technology, IEEE Transactions (vol. 52, Issue: 3, May 2003) pp. 683-692.*

* cited by examiner

*Primary Examiner* — Vivek Koppikar
*Assistant Examiner* — Jason Roberson
(74) *Attorney, Agent, or Firm* — Clifford B Vaterlaus

(57) ABSTRACT

A vehicle in which a drive state can be favorably selected in a configuration that separately and independently drives front and rear wheels and a method for controlling the vehicle. In the vehicle and control method thereof, a drive state control device prohibits operation of a first switch between front wheel drive (FWD) and all wheel drive (AWD) and a second switch between rear wheel drive (RWD) and AWD when a lateral acceleration related value of the vehicle exceeds a first threshold value G1. The first threshold value G1 is set with a divergence reference value Gref as a reference. The Gref value is determined considering factors such as lateral acceleration, turning characteristics and the drive state of the vehicle.

19 Claims, 14 Drawing Sheets

VEHICLE AND METHOD FOR CONTROLLING VEHICLE

CROSS REFERENCE TO RELATED APPLICATIONS

The present application claims priority under 35 U.S.C. §119 to Japanese Patent Application No. 2012-081689 filed Mar. 30, 2012, entitled "Vehicle and Method for Controlling Vehicle" the contents of which are incorporated herein by reference in their entirety.

BACKGROUND

The present disclosure relates to a vehicle that switches between, for example, front wheel drive, rear wheel drive, and all wheel drive, and to a control method thereof.

It is known to provide a drive method of a vehicle having an engine that drives from wheels and motors that drive rear wheels (auxiliary drive wheels). In such method, execution of positive drive is prohibited when lateral G (i.e. lateral acceleration) exceeds a predetermined value, as it is preferable to leave attitude control of a vehicle to a steering wheel operation by a driver. "Positive drive" mentioned in related art refers to drive auxiliary and is defined as an antonym of braking as "reverse drive". Moreover, from the perspective that improving stability of a vehicle in four wheel drive is preferred, positive drive can be forcibly executed in independent mode.

Further, a four wheel drive vehicle has been proposed that can separately and independently drive front wheels and rear wheels. In such vehicle, front wheels are driven by a drive unit in which an internal combustion engine and an electric motor are arranged in-line, and rear wheels are driven by electric motors.

As described in the related art discussed above, front wheels are the main drive wheels that are driven by the engine and the rear wheels are auxiliary drive wheels driven by the motors. In other words, a vehicle according to one known embodiment can provide front wheel drive by the engine alone or four wheel drive by the engine and motors, but rear wheel drive by the motors alone is not addressed. Further, a study has not been provided concerning what specific value should be given to the predetermined value for lateral G.

In light of the problems described above, an aspect of the present disclosure is to provide a vehicle in which a drive state can be favorably selected in a configuration that separately and independently drives front wheels and rear wheels and to provide a method for controlling the vehicle.

SUMMARY

A method for controlling a vehicle according to one embodiment of the present disclosure includes: a front wheel drive device that drives front wheels, a rear wheel drive device that drives rear wheels separately and independently from the front wheel drive device, and a drive state control device that controls the front wheel drive device and the rear wheel drive device to control a drive state of the front wheels and the rear wheels. The drive state control device performs a first switch to switch between a front wheel independent drive state that drives only the front wheels and a combined drive state that drives both the front wheels and the rear wheels, and a second switch to switch between a rear wheel independent drive state that drives only the rear wheels and the combined drive state. The drive state control device prohibits the first switch and the second switch when a lateral acceleration related value related to a lateral acceleration acting on the vehicle exceeds a first threshold value. The drive state control device sets the first threshold value as a reference for a divergence reference value for whichever value of a first lateral acceleration related value and a second lateral acceleration related value is smaller, when a first correlation is defined as a correlation between the lateral acceleration related value and a turning characteristic related value in the front wheel independent drive state, a second correlation is defined as a correlation between the lateral acceleration related value and the turning characteristic related value in the rear wheel independent drive state, a third correlation is defined as a correlation between the lateral acceleration related value and the turning characteristic related value in the combined drive state, while at the same time, the first lateral acceleration related, value is defined as the lateral acceleration related value when the turning characteristic related value in the first correlation and the turning characteristic related value in the third correlation diverge by a first predetermined value or greater, and the second lateral acceleration related value is defined as the lateral acceleration related value when the turning characteristic related value in the second correlation and the turning characteristic related value in the third correlation diverge by a second predetermined value or greater.

According to one embodiment of the present disclosure, when the lateral acceleration related value is greater than the first threshold value, the first switch that switches between the front wheel independent drive state and the combined drive state, as well as the second switch that switches between the rear wheel independent drive state and the combined drive state, are prohibited. The first threshold value is set as a reference using as a divergence reference value the smaller value of a first acceleration related value, where a divergence (amount of change) of a turning characteristic related value before and after the first switch is at a first predetermined value or greater, and a second acceleration related value, where a divergence (amount of change) of a turning characteristic related value before and after the second switch is at a second predetermined value or greater. Therefore, unintended sudden changes in turning characteristic related values that accompany the first switch and the second switch can be suppressed.

In particular, because the first threshold value is set as a reference using the divergence reference value which is the smaller value of the first acceleration related value and the second acceleration related value, unintended sudden changes can be suppressed even if either of the first switch or the second switch is implemented.

Accordingly, a drive state can be favorably selected.

In one embodiment of the present disclosure, the first threshold value may be set as a value of not more than the divergence reference value, and when the lateral acceleration related value has increased to the first threshold value, the drive state control device prohibits the first switch and the second switch, and fixes the drive state of the vehicle in a state that has been preset from among the front wheel independent drive state, the rear wheel independent drive state, or the combined drive state. In this embodiment, because switching the drive state is prohibited at a stage where the lateral acceleration related value is not more than the divergence reference value, unintended sudden changes can be more surely suppressed.

In another embodiment of the present disclosure, as first drive device of either the front wheel drive device or the rear wheel drive device may include an internal combustion engine and a second drive device may include, for example, an electric motor.

In one embodiment, the drive state of only the second drive device may be used when the lateral acceleration related value is smaller than the first threshold value, and the combined drive state may be set when the lateral acceleration related value has increased to the first threshold value. According to the above, when the lateral acceleration related value is small, a drive state of only the electric motor is in effect from a perspective of energy efficiency, and when the lateral acceleration related value is large, the combined drive state is in effect from a perspective of drivability and operating stability (performance where the vehicle can be operated according to the will of the driver), and therefore, the energy efficiency of the vehicle and the driving performance of the vehicle can be improved.

The vehicle may also be provided with an electric, motor determiner that determines that the electric motor is unable to drive, whereby when it is determined by the electric motor determiner that the electric motor is unable to drive, the drive state of only the first drive device is used, even if the lateral acceleration related value has increased to the first threshold value. Accordingly, a mode change to a drive state that includes an electric motor that is unable to drive can be prevented.

The electric motor determiner may determine the inability to drive based on a temperature of the electric motor, an occurrence of an abnormality in the electric motor, a state of power supply availability of a power source that supplies power to the electric motor, or a vehicle speed, for example.

In one embodiment, the internal combustion engine may be stopped without allowing idling in the drive state of only the second drive device and the internal combustion engine may be started when the lateral acceleration related value has increased to a second threshold value that is smaller than the first threshold value. In this embodiment, it is possible to rim the internal combustion engine at a constant level until the lateral acceleration related value reaches the first threshold value. Therefore, transition to the combined drive state can be performed smoothly once the lateral acceleration related value has reached the first threshold value.

The first threshold value may be changed based on at least one of the following, for example: a longitudinal acceleration acting on the vehicle, a vehicle speed, or an acceleration intent related value that indicates an intent of the driver to accelerate. Accordingly, the first threshold can be more appropriately set.

In one embodiment, the first threshold may be stored in advance in a memory. Accordingly, identifying the first lateral acceleration related value and the second lateral acceleration related value and calculating the first threshold value based on a comparison of these is not necessary while the vehicle is running, and calculation of the first threshold value can be done quickly.

In one embodiment, the first threshold value may be determined considering the lateral acceleration acting on the vehicle, a turning characteristic related value, and the drive state of the front wheels and the rear wheels.

The vehicle according to the present disclosure executes the above control method.

DETAILED DESCRIPTION

Figure 1:
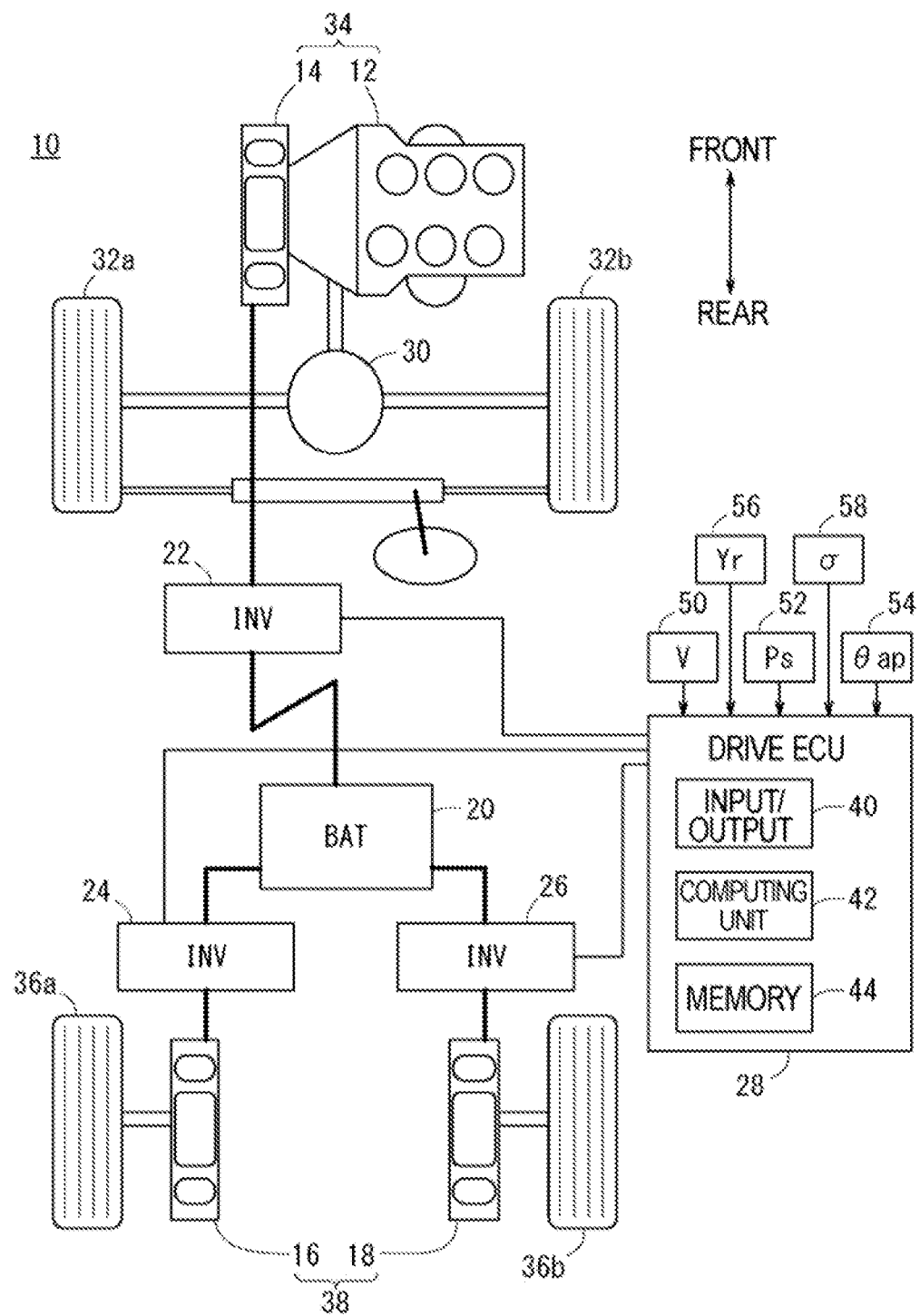
FIG. 1 is a schematic configuration of a drive train and a periphery thereof of a vehicle according to one embodiment of the present disclosure.

FIG. 1 is a schematic configuration of a drive train and a periphery thereof of a vehicle 10 according to one embodiment of the present disclosure. As illustrated in FIG. 1, vehicle 10 is provided with an engine 12 and a first traction motor 14 (hereinafter referred to as a "first motor 14" or "front motor 14") arranged in-line on the front side of the vehicle 10, second and third traction motors 16 and 18 (hereinafter referred to as "second and third traction motors 16 and 18" or "rear motors 16 and 18") arranged on the rear side of the vehicle 10, a high-tension battery 20 (hereinafter referred to as "battery 20"), first, second, and third inverters 22, 24, and 26, and a drive electronic control device 28 (hereinafter referred to as "drive ECU 28" or "ECU 28").

The engine 12 and the first motor 14 transfer a driving force (hereinafter referred to as "front wheel driving force Ff") to the left front wheel 32a and the right front wheel 32b (hereinafter referred to generically as "front wheels 32") via a transmission 30. The engine 12 and the first motor 14 configure a front wheel drive device 34 (steering wheel drive device). For example, drive can be provided by only the first motor 14 when the vehicle 10 has a light load, while drive can be provided by only the engine 12 when there is as medium load, and drive can be provided by the engine 12 and the first motor 14 when there is a heavy load. Alternatively, the first motor 14 can be driven by the engine 12 in a state in which the engine 12 and the transmission 30 are in a state disengaged by a clutch not shown for in a connected state) to generate electricity by the first motor 14, and such generated power can be used to charge the battery 20 or to power an auxiliary device not shown. In other words, the first motor 14 can be used as an electric generator.

The second motor 16 has an output shaft that is connected to a rotary shaft of the left rear wheel 36a to transfer a driving force to the left rear wheel 36a. The third motor 18 has an output shaft that is connected to a rotary shaft of the right rear wheel 36b to transfer a driving force to the right rear wheel 36b. The second and third motors 16 and 18 configure the rear wheel drive device 38 (non-steering wheel drive device). The left rear wheel 36a and the right rear wheel 36b will hereinafter be referred to collectively as rear wheels 36. In addition, the driving force transferred from the rear wheel drive device 38 to the rear wheels 36 will be referred to as a rear wheel driving force Fr.

The high-tension battery 20 supplies power to the first, second, and third motors 14, 16, and 18 through first, second, and third inverters 23, 24, and 26 and is charged with regenerated energy from the first, second, and third motors 14, 16, and 18.

The drive ECU 28 controls the engine 12 and the first, second, and third converters 22, 24, and 26 based on output from various sensors and various electronic control devices (hereinafter referred to as "ECU") to control the output of the engine 12 and the first, second, and third motors 14, 16, and 18. The drive ECU 28 includes an input/output part 40, a computation section 42, and a memory 44. In addition, the drive ECU 28 may also be combined with a plurality of ECUs. The drive ECU 28 may also be configured, for example, of a plurality of ECUs provided for the engine 12 and the first, second, and third motors 14, 16, and 18 respectively and an ECU that manages the drive states of the engine 12 and the first, second, and third motors 14, 16, and 18.

Various sensors that output to the drive ECU 28 may include, for example, a vehicle speed sensor 50, a shift position sensor 52, an accelerator pedal opening angle sensor 54, a yaw rate sensor 56, and a tire steering angle sensor 58.

The engine 12 is, for example, a six cylinder engine or may also be a two cylinder, four cylinder, eight cylinder or other type of engine. Further, the engine 12 is not limited to a gasoline engine, and may be a diesel engine, an air intake engine, or the like.

The first, second, and third motors 14, 16, and 18 are, for example, a three-phase AC brushless type, but may be a three-phase AC brush type, a single phase AC type, a DC type, or the like, or any other type of motor. The specifications for the first, second, and third motors 14, 16, and 18 may be identical or may be different. In addition, a single traction motor may be provided to drive the left rear wheel 36a and the right rear wheel 36b.

The first, second, and third inverters 22, 24, and 26 have a three-phase bridge type configuration, perform conversion of DC/AC, convert direct current to three-phase alternating current to supply to the first, second, and third motors 14, 16, and 18 and supply direct current to the high tension battery 20 after an AC/DC conversion that accompanies the regeneration operation of the first, second, and third motors 14, 16, and 18.

The high tension battery 20 is an energy storage device that includes a plurality of battery cells, and for example, a lithium ion secondary battery, a nickel hydrogen secondary battery, or capacitors and the like may be used thereas. Lithium ion secondary batteries are used in this embodiment. Note that a DC/DC converter (not shown is provided between the high tension battery 20 and the first, second, and third inverters 22, 24, and 26, and the output voltage of the high tension battery 20 or the output voltages of the first, second, and third motors 14, 16, and 18 may be increased or decreased.

It will be appreciated that any suitable drive train known to those skilled in the art may be used as the configuration of the drive train of the vehicle 10.

The vehicle speed sensor 50 detects the vehicle speed V (km/h). The shift position sensor 52 detects a position of the shift lever (not shown; "P" for park range, "N" for neutral range, "D" for forward drive range, and "R" for reverse drive range, and the like; hereinafter referred to as "shift position Ps"). The accelerator pedal opening angle sensor 54 detects an opening angle of the accelerator pedal (not shown, hereinafter referred to as "accelerator opening angle θap"). The yaw rate sensor 56 detects a yaw rate Yr of the vehicle 10. The tire steering angle sensor 58 gives an actual steering angle (hereinafter referred to as "tire steering angle σ") of the front wheels 32 as the steering wheels.

Figure 2:
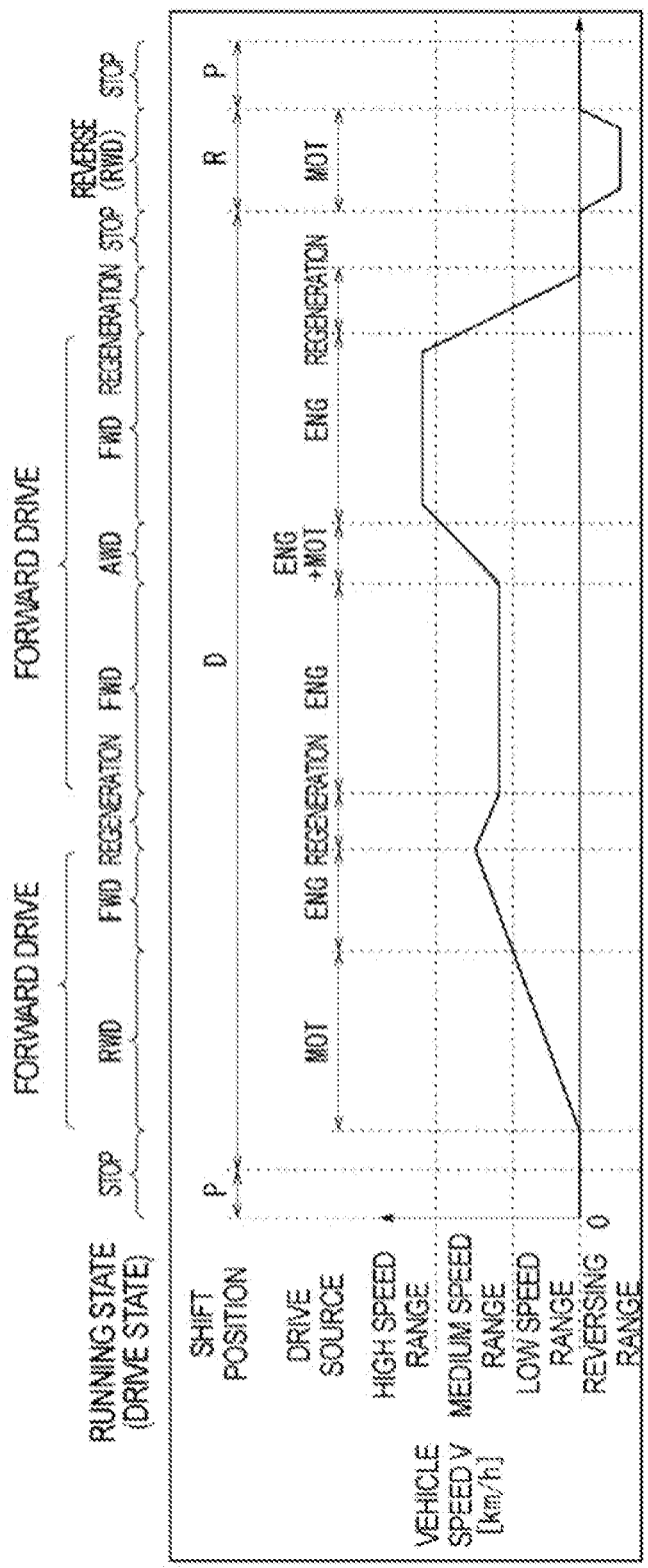
FIG. 2 is a diagram illustrating one example of an aspect of switching of a running state (driving state) and a drive source in the embodiment.

FIG. 2 is a diagram illustrating one example of an aspect of switching a running state (driving state) and a drive source in this embodiment. In this embodiment, switching the running state (drive state) and the drive source are controlled by the drive ECU 28.

The "running state" of FIG. 2 indicates any of the vehicle 10 being stopped, driving forward, regenerating, or driving in reverse. The "drive state" indicates that the vehicle 10 is driving in any of "RWD" (rear wheel drive), "FWD" (front wheel drive), or "AWD" (all wheel drive). RWD and FWD are both two wheel drive (2WD), and AWD is four wheel drive (4WD). Further, regeneration shown in FIG. 2 indicates that regeneration is occurring in at least one of the first, second, and third traction motors 14, 16, and 18.

In addition, in FIG. 2, the "shift position" indicates the position of the shift lever (not shown), and "P" indicates a parking range, "D" indicates a forward driving, range, and "R" indicates a reverse driving range.

Further, in FIG. 2, "drive source" indicates a device that drives the vehicle 10. "ENG" indicates the engine 12, "MOT" when the drive state is "RWD" indicates the rear motors 16 and 18, "ENG+MOT" when the drive state is "AWD" indicates the ermine 12 together with the front and rear motors 14, 16, and 18, and "regeneration" indicates at least one of the front and rear motors 14, 16, and 18.

As illustrated in FIG. 2 in this embodiment, vehicle speed V is classified into "low speed range," "medium speed range," "high speed range," and "reverse range," and the drive source switches according to these classifications. More specifically, RWD is used for the vehicle speed V when forward driving in the low speed range and when driving in reverse.

FWD or AWD is used for the vehicle speed V when forward driving in the medium speed range. A threshold value thereinafter referred to as "accelerator opening angle threshold value THθ" or "threshold value THθ") for the accelerator opening angle θap is provided for switching between FWD and AWD. When the accelerator opening angle θap is below the accelerator opening angle threshold value THθ. FWD is selected, and when the accelerator opening angle θap exceeds the accelerator opening angle threshold value, AWD is selected. FWD is used for the vehicle speed V when forward driving in the high speed range.

Note that switching of the running state (drive state) may be performed by any suitable method known to those skilled in the art.

Figure 3:
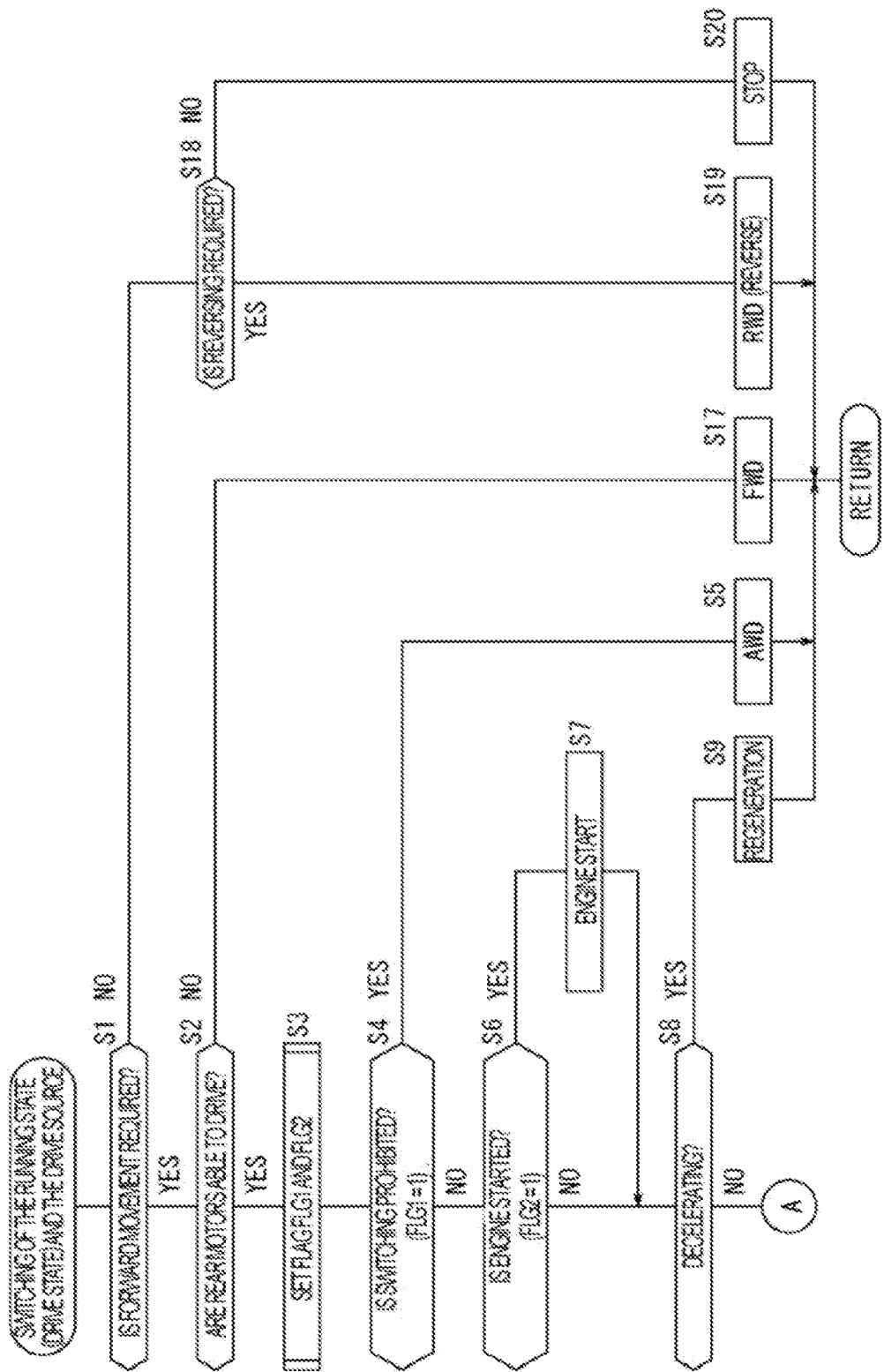
FIG. 3 is a first flowchart of switching of a running state (driving state) and a drive source in the embodiment.
Figure 4:
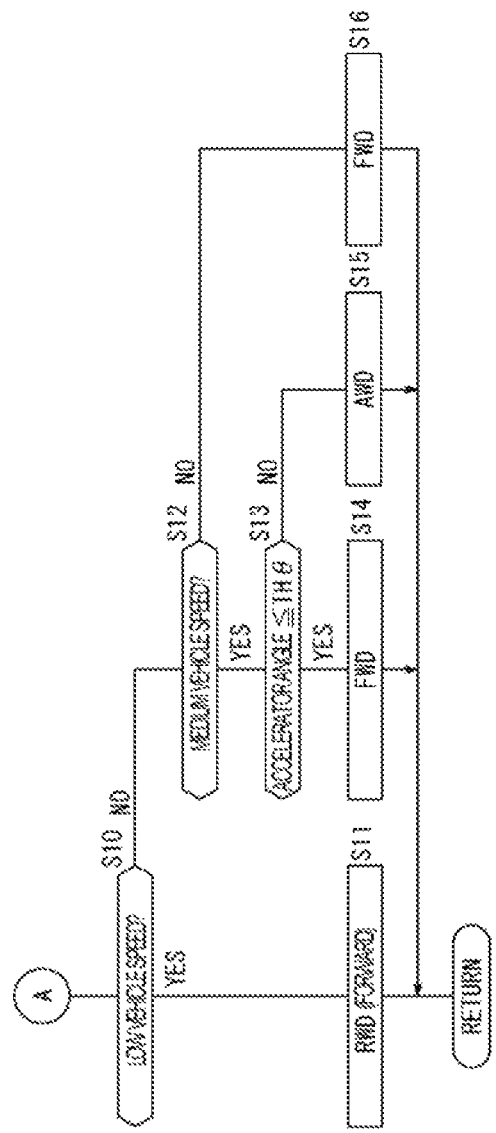
FIG. 4 is a second flowchart of switching of a running state (driving state) and a drive source in the embodiment.

FIGS. 3 and 4 are first and second flowcharts of switching of a running state (drive state) and a drive source in this embodiment. In step S1, the ECU 28 determines whether moving forward is required for the vehicle 10. This determination is made by confirming whether, for example, the shift position Ps notified from the shift position sensor 52 is in a position (forward driving range D) indicating forward movement. If forward movement is required (S1: Yes), the process proceeds to step S2.

in step S2, the ECU 28 determines whether the rear motors 16 and 18 can drive. This determination is made based on, for example, a temperature of the rear motors 16 and 18, an occurrence of an abnormality in the rear motors 16 and 18, or a state of charge (SOC) of the battery 20.

More specifically, the temperatures of the rear motors 16 and 18 respectively (hereinafter referred to as "rear motor temperature") are detected by a temperature sensor (not illustrated). If the rear motor temperature exceeds a threshold value for determining overheating of the rear motors 16 and 18, it is determined that the rear motors 16 and 18 are unable to drive. In addition, if the output from the various sensors relating to the rear motors 16 and 18 (for example, a voltage sensor, a current sensor, and a rotational angle sensor) exceeds as threshold value for determining that an abnormality has occurred in the rear motors 16 and 18, it is determined that the rear motors 16 and 18 are unable to drive. Furthermore, if the SOC of the battery 20 is below a threshold value for determining whether the rear motors 16 and 18 are sufficient to drive, it is determined that the rear motors 16 and 18 are unable to drive. Note that, as will be described below, the determination of whether the rear motors 16 and 18 can drive may be performed based on acceptance criteria other than those described above.

If the rear motors 16 and 18 can drive (S2: Yes), the ECU 28, in step S3, sets to first flag FLG 1 and a second flag FLG 2 based mainly on the lateral G force (lateral acceleration related value). The first flag FLG 1 is a flag that sets whether switching of the drive state is prohibited (drive state switching prohibiting determination flag) and is used in step S4 described below. The second flag FLG 2 is a flag that sets whether to start the engine 12 regardless of whether the drive state is in FWD, RWD, or AWD (engine start determination flag) and is used in step S6 described below. Details of setting methods for the first flag FLG 1 and the second flag FLG 2 are described hereinafter using FIG. 7.

in the next step S4, the ECU 28 determines whether switching the drive state is prohibited based on the first flag FLG 1. Specifically, when the first flag FLG 1 is 0, switching the drive state is not prohibited (permitted), and when the first flag FLG 1 is 1, switching the drive state is prohibited.

When the first flag FLG 1 is 1 and switching the drive state is prohibited (S4: Yes), the ECU 28, in step S5, fixes the drive state in AWD. When switching the drive state is not prohibited (S4: No), the process proceeds to step S6.

In step S6, the ECU 28 determines whether to start the engine 12 based on the second flag FLG 2. Specifically, when the second flag FLG 2 is zero, the engine 12 will not be started according to the determination made in step S6, and when the second flag FLG 2 is 1, the engine 12 will be started regardless of whether the drive state is FWD, RWD, or AWD.

When the engine 12 does not start based on the second flag FLG 2 (S6: No), the process proceeds to step S8. When the engine 12 starts based on the second flag FLG 2 (S6: Yes), the ECU 28, in step S7, starts the engine 12 and proceeds to step S8.

Note that, as described above, the starting of the engine 12 in step S7 is performed regardless of whether the drive state is FWD, RWD, or AWD. In other words, because the engine 12 is always running, it can always remain in a running state as long as the drive state at that time is either FWD or AWD. On the other hand, because the rear motors 16 and 18 are used as the drive source, the engine 12 that has been started is rested in an idling state as long as the drive state at that time is RWD.

The reason an idling state is taken in this manner when the second flag FIG. 2 is 1 is to smoothly transition to AWD, because switching of the drive state is prohibited thereafter, giving a high likelihood of switching to AWD (S5).

In step S8, the ECU 28 determines whether the vehicle 10 is deceleration. This determination is made using, for example, the vehicle speed V from the speed sensor 50. When the vehicle 10 is decelerating (S8: Yes), the ECU 28, in step S9, selects regeneration as the running state. In conjunction with this, the ECU 28 executes regeneration in at least one of the first, second, and third traction motors 14, 16, and 18. Meanwhile, when the vehicle 10 is not decelerating (S8: No), the process proceeds to step S10 of FIG. 4.

In step S10 of FIG. 4, the ECU 28 determines whether the vehicle 10 is at a low speed (for example, from 0 to 30 km/h). This determination is made using, for example, the vehicle speed V from the speed sensor 50. When the vehicle 10 is at a low speed (S10: Yes), the ECU 28, in step S11, selects RWD as the drive state. In conjunction with this, the vehicle 10 is driven by the rear motors 16 and 18. Meanwhile, when the vehicle 10 is not at a low speed (S10: No), the process proceeds to step S12.

In step S12, the ECU 28 determines whether the vehicle 10 is at a medium speed (for example, from 31 to 80 km/h). This determination is made using, far example, the vehicle speed V from the speed sensor 50. When the vehicle 10 is at a medium speed (S12: Yes), the ECU 28, in step S13, determines Whether the accelerator opening angle θap is not more than the accelerator opening angle threshold value THθ. As described above, the threshold value THθ is a threshold value used in the selection of FWD or AWD.

When the accelerator opening angle θap is not more than the threshold THθ (S13: Yes), the ECU 28, in step S14, selects FWD as the drive state. In conjunction with this, the vehicle 10 is driven by one or both of either the engine 12 and the first motor 14. When the accelerator opening angle θap is not more than the threshold THθ (S13: No), the ECU 28, in step S15, selects AWD as the drive state. In conjunction with this, the vehicle 10 is driven by the engine 12 and the first, second, and third motors number 14, 16, and 18.

Returning to step S12, if the vehicle 10 is not at a medium speed (S12: No), the vehicle 10 can be said to be running at a high speed (for example, 81 km/h or faster). In this case, in step S16, the ECU 28 selects FWD as the drive state.

Returning to step S2 of FIG. 3, wherein the rear motors 16 and 18 are unable to drive (S2: No), the ECU 28, in step S17 selects FWD as the drive state. Accordingly, a mode change to RWD or AWD while the rear motors 16 and 18 are unable to drive can be prevented.

Returning to step S1, when forward movement is not required (S1: No), the ECU 28, in step S18, determines whether reversing is required for the vehicle 10. This determination is made by confirming whether, for example, the shift position Ps notified from the shift position sensor 52 is in a position (reverse driving range R) indicating reverse movement. When reversing is required (S18: Yes), the ECU 28, in step S19, selects RWD as the drive state. When reversing is not required (S18: No), the ECU 28, in step S20, selects stop as the running state, and both the engine 12 and the first, second, and third motors number 14, 16, and 18 are stopped.

Figure 5:
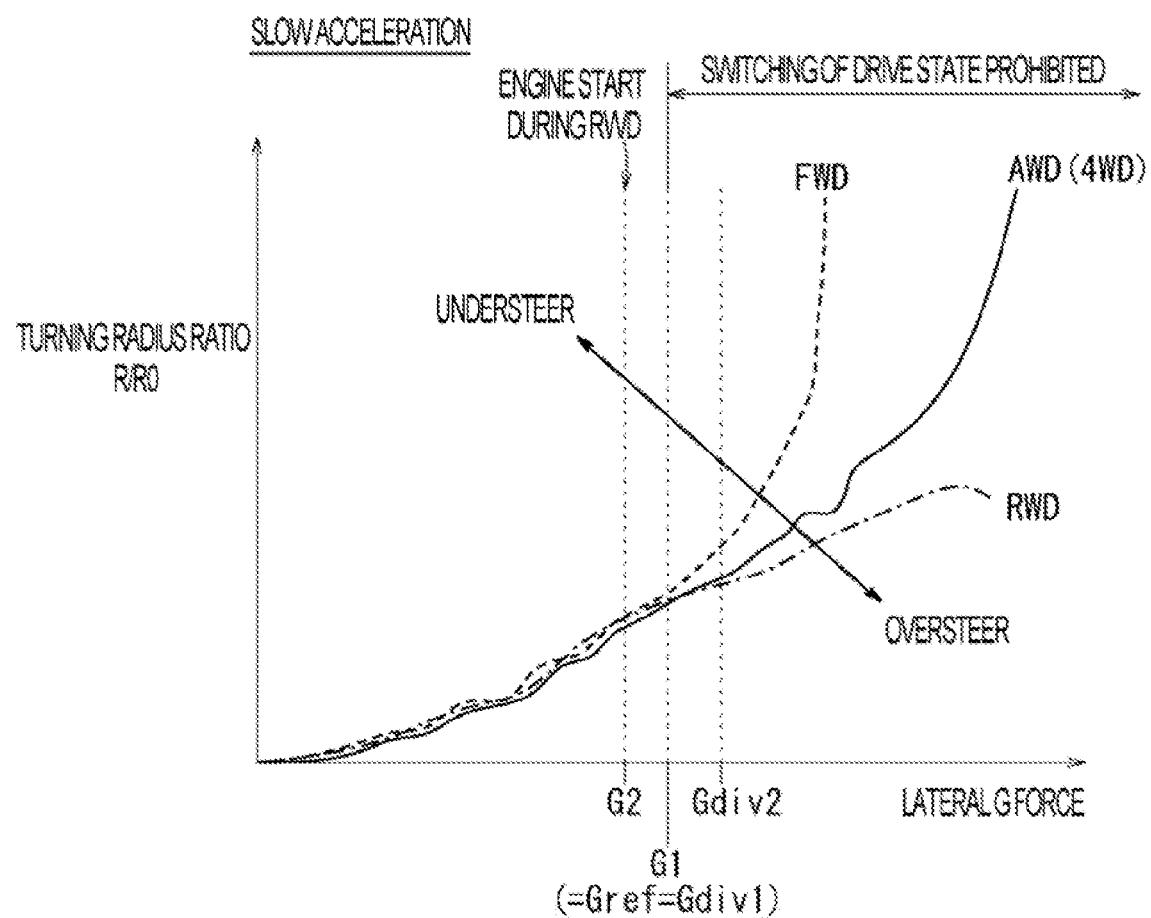
FIG. 5 is a diagram illustrating a relationship between lateral acceleration (hereinafter referred to as "lateral G force") and a turning radius ratio at the time of slow acceleration according to the drive state in one embodiment.

FIG. 5 is as diagram illustrating a relationship between lateral G force and a turning radius ratio R/R0 at the time of slow acceleration according to the drive state. Slow acceleration referred to here indicates that acceleration of the vehicle 10 occurs slowly (the time derivative of the vehicle speed V is small), and for example, the accelerator opening angle θap corresponds to a comparatively small state. The turning radius ratio R/R0 is a value that indicates the extent that an actual turning radius R (m) diverges from a reference turning radius R0 (m). The turning radius ratio R/R0 is used as an indicator to express the turning characteristics of vehicle 10.

For example, any method known by those skilled in the art may be used for calculation of the reference turning radius R0 and the actual turning radius R.

Note that when the actual turning radius R is smaller relative to the reference turning radius R0 and the turning radius ratio R/R0 becomes smaller, this indicates that there is a tendency for oversteer. On the other hand, when the actual turning radius R is larger relative to the reference turning radius R0 and the turning radius ratio R/R0 becomes larger, this indicates that there is a tendency for understeer.

Figure 6:
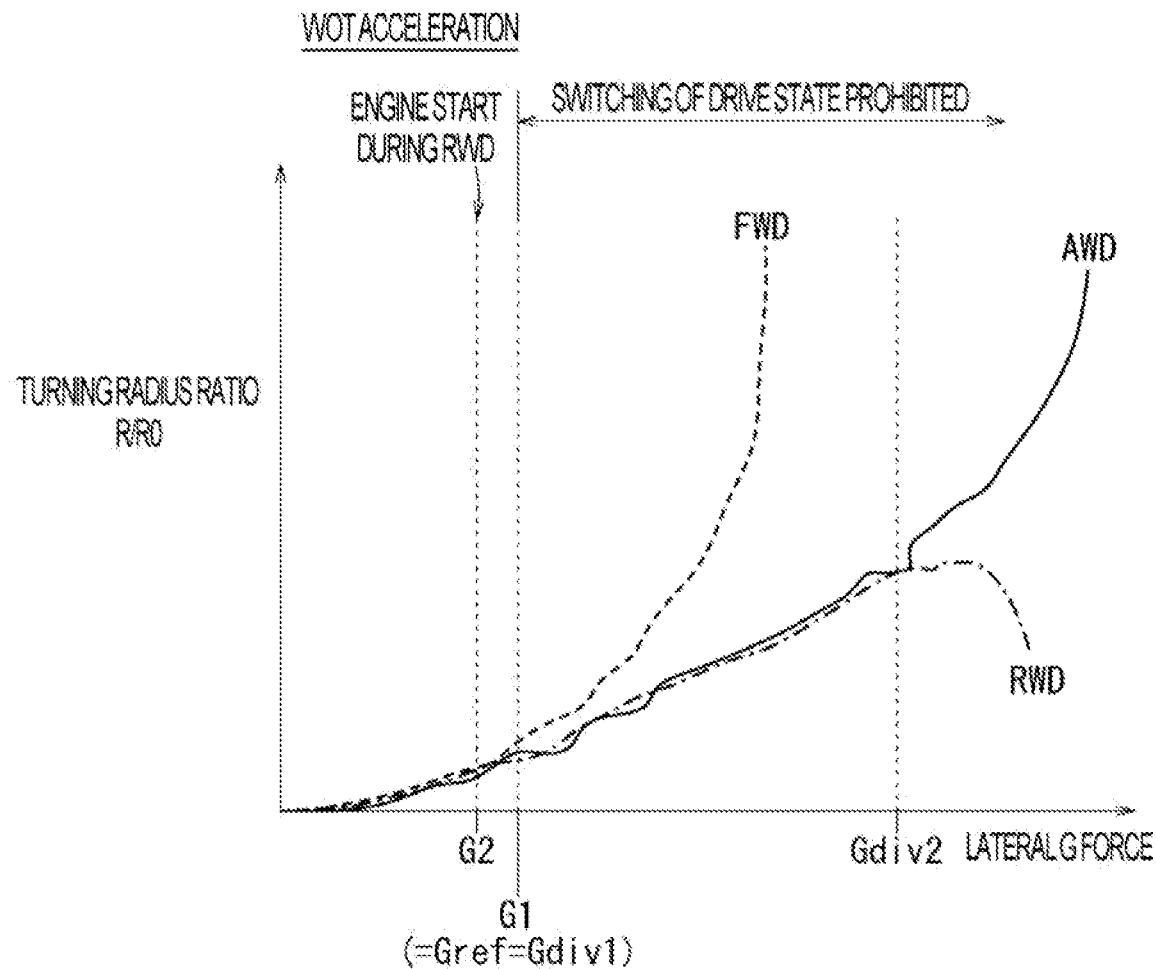
FIG. 6 is a diagram illustrating a relationship between the lateral G force and the turning radius ratio during wide open throttle (WOT) according to the drive state in one embodiment.

FIG. 6 is a diagram illustrating a relationship between the lateral G force and the turning radius ratio R/R0 during wide open throttle (WOT) according to the drive state. WOT indicates a so-called full throttle where the accelerator opening angle θap is at maximum.

As illustrated in FIG. 5 (and FIG. 6), when lateral G force is below a first divergence generation value Gdiv 1 (first lateral G force), the turning radius ratio R/R0 for each drive state (FWD, RWD, and AWD) take nearly identical values. When the lateral G force exceeds the first divergence generation value Gdiv 1, the turning radius ratio R/R0 for FWD and the turning radius ratio R/R0 for RIND and AWD begin to diverge. In addition, when the lateral G force exceeds a second divergence generation value Gdiv 2 (second lateral G force), the turning radius ratio R/R0 for RWD and the turning radius ratio R/R0 for AWD begin to diverge.

As described above, when divergence of the turning radius ratio R/R0 occurs in each drive state for the same lateral G force (which is to say, when the divergence amount exceeds a predetermined value), the turning characteristics of the vehicle 10 may potentially change suddenly by switching driving states, thereby giving an uneasy feeling to the driver. Therefore, in this embodiment, when lateral G force exceeds a predetermined threshold value (hereinafter referred to as "drive state switch prohibiting threshold value G1" or "first lateral G force threshold value G1"), switching of the drive state is prohibited.

Note that, in FIG. 5, the first lateral G force threshold value G1 is set to a value equivalent to the lateral G force where divergence begins to occur in the turning, radius ratio R/R0 for FWD, RWD, and AWD (in other words, the first divergence generation value Gdiv 1). Alternatively, the first lateral G force threshold value G1 may be set to a value that is smaller than the first divergence generation value Gdiv 1 at the point that actual divergence begins, from the perspective of surely prohibiting switching of the drive state. Alternatively, from the perspective of suppressing the divergence amount to less than a predetermined value, the first lateral G force threshold value G1 can be set to a value that is slightly larger than the first divergence generation value Gdiv 1.

Furthermore, as is evident from FIG. 5, there is a first divergence generation value Gdiv 1 and a second divergence generation value Gdiv 2 for the lateral G force where divergence of the turning radius ratio R/R0 occurs for each drive state. Of these, in this embodiment, the smaller value (which is to say, the first divergence generation value Gdiv 1) is set as the first lateral G force threshold value G1. Hereinafter, the smaller value of the first divergence generation value Gdiv 1 and the second divergence generation value Gdiv 2 will be referred to as the "divergence reference value Gref."

As can be understood when comparing FIG. 5 and FIG. 6, the turning radius ratio R/R0 at each drive state (as well as the first divergence generation value Gdiv 1, the second divergence generation value Gdiv 2, and the divergence reference value Gref) changes depending on the state of acceleration (for example, the difference between slow acceleration and WOT acceleration). Therefore, in this embodiment, the first lateral G force threshold value G1 varies according to the accelerator opening angle flap. Other indicators may be used in addition to the accelerator opening angle flap, or in place of the accelerator opening angle flap, to make the first lateral G force threshold value G1 variable.

Further, in this embodiment, the drive state is fixed in AWD when switching of the drive state is prohibited in conjunction with an increase in the lateral G force (S5 of FIG. 3). Accordingly, stabilizing the disposition of the vehicle 10 becomes easier even with a large lateral G force.

Fixing the drive state in AWD also operates the engine 12. When starting the engine 12 for the first time once lateral G force has reached the first lateral G force threshold value G1, there may be a risk of instability in the running state until the engine 12 reaches the required output. Therefore, in this embodiment, a threshold value of lateral G force to start the engine 12 (hereinafter referred to as "engine start threshold value G2" or "second lateral G force threshold value G2") is set. The second lateral G force threshold value G2 is set to a value that is smaller than the first lateral G force threshold value G1. Accordingly, a smooth transition can be performed to AWD from a drive state where the engine 12 is not used for driving (in other words, RWD).

Figure 7:
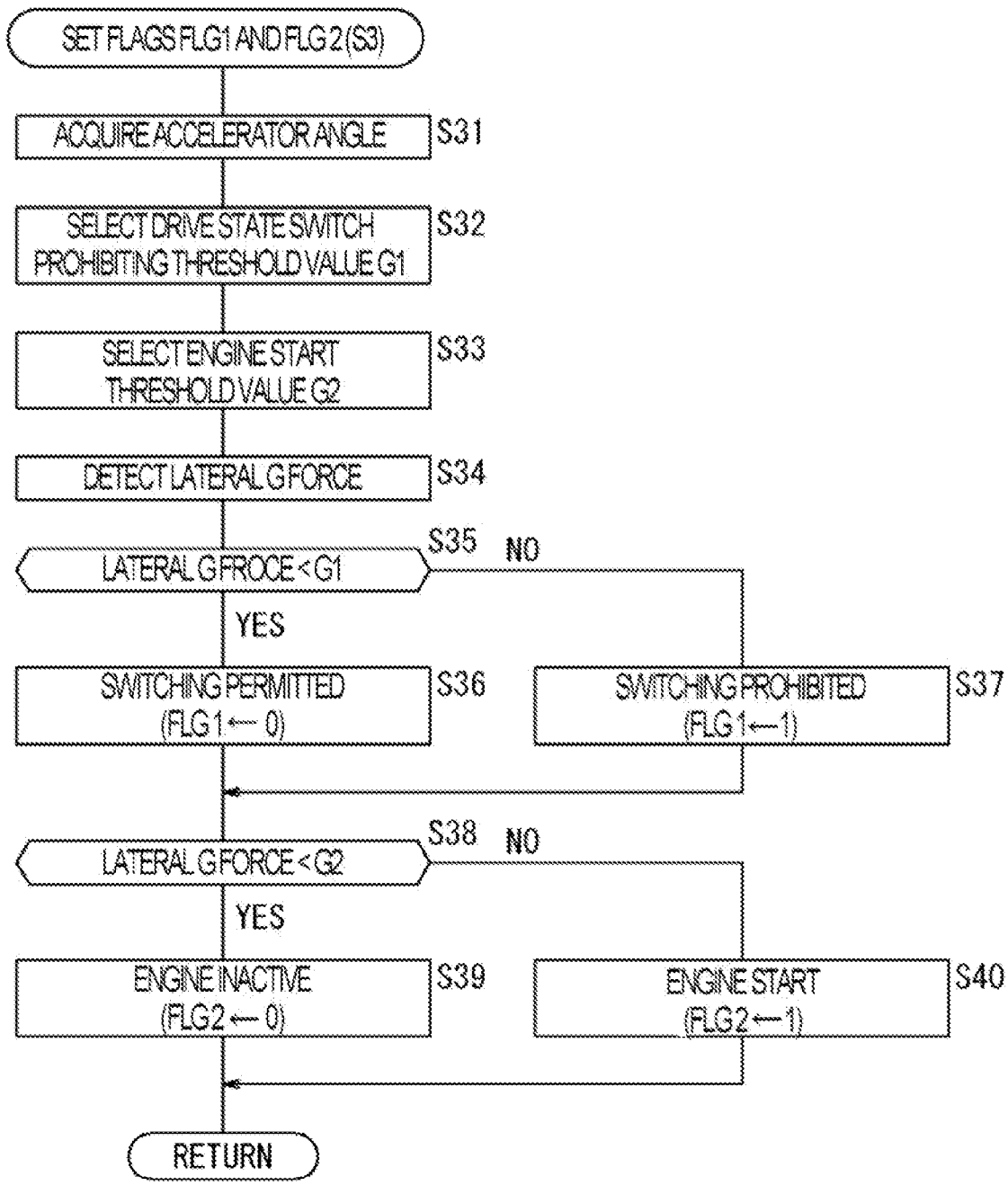
FIG. 7 is a flowchart (detail of S3 of FIG. 3) that sets as first flag and a second flag in one embodiment.

FIG. 7 is a flowchart (detail of S3 of FIG. 3) that sets a first flag FLG 1 and a second flag FLG 2. In step S31, the ECU 28 acquires the accelerator opening angle θap from the accelerator pedal opening angle sensor 54.

Figure 8:
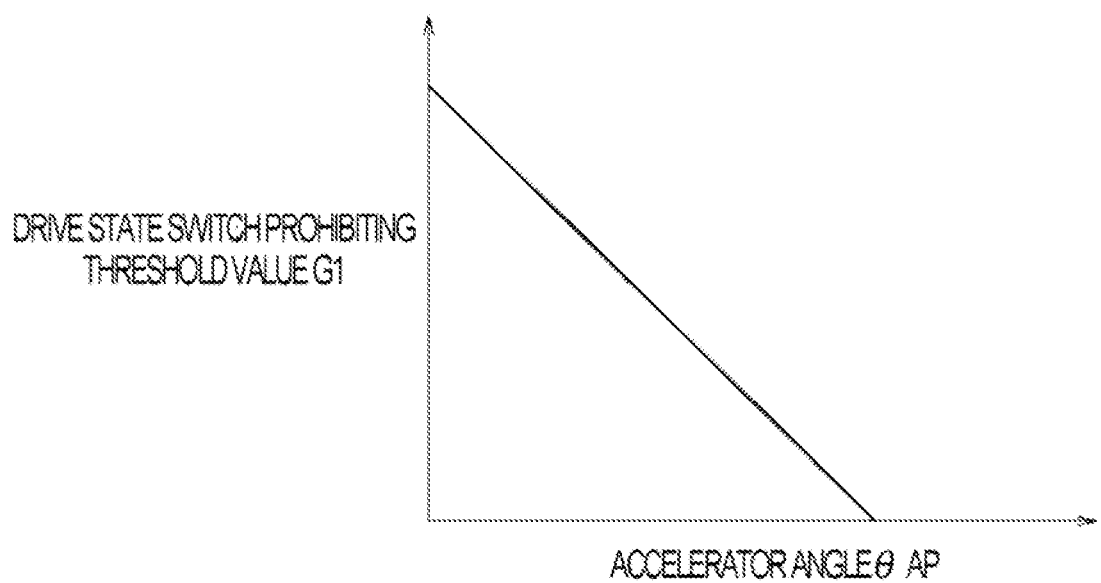
FIG. 8 is a diagram illustrating a first example of a relationship between accelerator opening angle and a drive state switch prohibiting threshold value.
Figure 9:
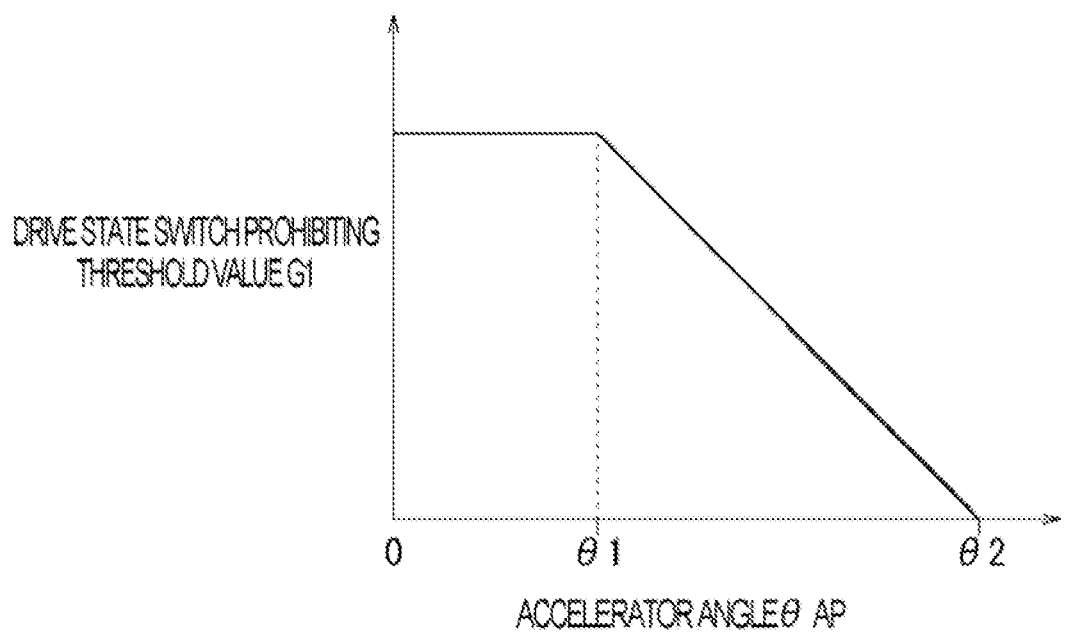
FIG. 9 is a diagram illustrating a second example of a relationship between the accelerator opening angle and the drive state switch prohibiting threshold value.

In step S32, the ECU 28 selects the drive state switch prohibiting threshold value G1 (first lateral G force threshold value G1) based on the accelerator opening angle θap (see FIGS. 5 and 6). Note that the relationship between the accelerator opening angle θap and the threshold value G1 is stored in advance in a memory 44 as a map as illustrated in FIGS. 8 and 9. Test values or simulation values can be used in this map.

In FIG. 8, the threshold value G1 decreases as the accelerator opening angle θap increases. Further, in FIG. 9, the threshold value G1 is constant when the accelerator opening angle θap is between 0 and θ1. This is because it is considered that there is no essential meaning to changing the threshold value G1 when the acceleration is in a low state (from 0 to θ1). Further, the threshold value G1 decreases when the accelerator opening angle θap is between θ1 and θ2. This is because, as described in reference to FIGS. 5 and 6 and the like, the first divergence generation value Gdiv 1 and the second divergence generation value Gdiv 2 get smaller at the same time that the longitudinal acceleration (longitudinal G force) gets larger with the increase in the accelerator opening angle θap.

In step S33, the ECU 28 selects the engine start threshold value G2 (second lateral G force threshold value G2) based on the accelerator opening angle θap (see FIGS. 5 and 6). Note that the relationship between the accelerator opening angle θap and the threshold value G2 is stored in the memory 44 in advance as a map in the same manner as the threshold value G1. Test values or simulation values can be used in this map. Alternatively, the threshold value G2 may be set based on the threshold value G1, with a difference between the threshold value G2 and the threshold value G1 set in advance.

In step S34, the ECU 28 detects the lateral G force. Detection of the lateral G force may be performed by the following method. In other words, the ECU 28 detects (or calculates) the lateral G force using the following equation (1).

$$\text{Lateral G force} = (V2 \times \sigma)/(1+A+V2)/L \qquad (1)$$

Figure 10:
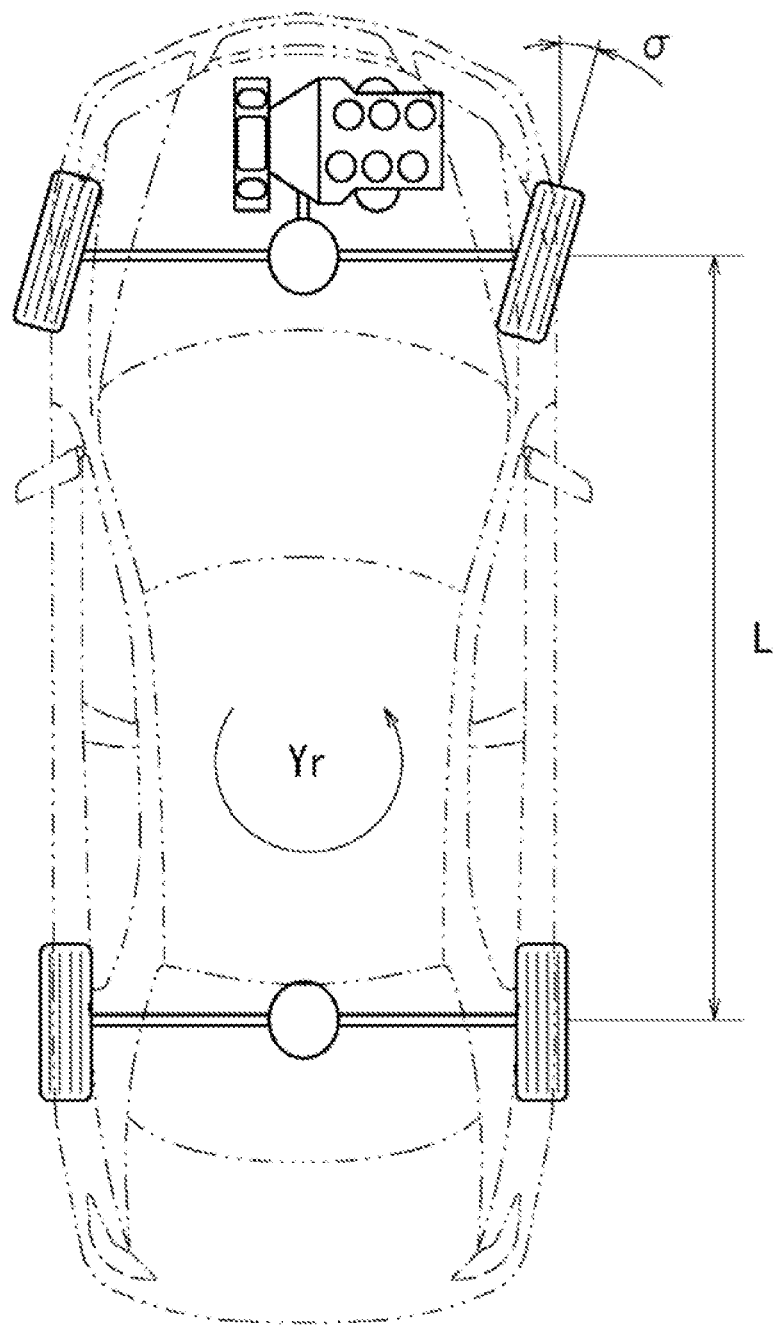
FIG. 10 is a diagram for explaining the definitions of various values used to detect lateral G force.

In equation (1), V is the vehicle speed detected by the speed sensor 50; σ is a tire steering angle calculated by the tire steering angle sensor 58; A is a stability factor; and L is the wheel base (see FIG. 10).

According to the above equation (1), lateral G force increases according to an increase in the tire steering angle σ. Therefore, the turning volition of the driver can be reflected even in a low μ road, where the first divergence generation value Gdiv 1 and the second divergence generation value Gdiv 2 are lower than that in a high μ road. In addition, according to equation (1), lateral G force can be detected even on an inclining road or the like.

Alternatively, the ECU 28 may detect (or calculate) the lateral G force using the following equation (2).

$$\text{Lateral G force} = Yr \times V \quad (2)$$

In equation (2), Yr is the yaw rate detected by the yaw rate sensor 56, and V is the vehicle speed detected by the speed sensor 50. According to equation (2), lateral G force can be detected even when the vehicle 10 is spinning. In addition, according to equation (2), LG can be detected even on an inclining road or the like.

Note that detection of the lateral G force may also be performed using a lateral G force sensor (electrostatic capacitance detection method, piezoresister method, and the like) that detects lateral G three by itself.

Returning to FIG. 7, in step S35, the ECU 28 determines whether the lateral G force detected in step S34 is below the drive state switch prohibiting threshold value G1 selected in step S32. When the lateral G force is below the threshold value G1 (S35; Yes), the ECU 28, in step S36, sets the first flag FLG 1 to 0 to permit switching of the drive state. Meanwhile, when the lateral G force is not below the threshold value G1 (S35: No), the ECU 28, in step S37, sets the first flag FLG 1 to 1 to prohibit switching of the drive state.

Next, in step S38, the ECU 28 determines whether the lateral G force detected in step S34 is below the engine start threshold value G2 selected in step S33. When the lateral G force is below the threshold value G2 (S38: Yes), the ECU 28, in step S39, sets the second flag FLG 2 to 0 to put the engine 12 in the stopped state, as long as the current drive state is RWD. Meanwhile, when the lateral G force is not below the threshold value G2 (S38: No), the ECU 28, in step S40, sets the second flag FIG. 2 to 1 to start the engine 12 even when the drive state is RWD.

Next, a description is given of the process for switching the running state (drive state).

When the drive ECU 28 determines to switch the running state (drive state) from RWD to FWD, the drive ECU 28 temporarily uses AWD in the process of transitioning from RWD to FWD.

Specifically, the driving force (rear wheel, driving force Fr) of the rear wheels 36 as the non-steering wheels gradually reduces, and the driving force (front wheel driving force Ff) of the front wheels 32 as the steering wheels gradually increases. Accordingly, a state where RWD and FWD exist together (for example, anywhere between 0.1 to 2.0 seconds) is used temporarily, which may also be stated as an AWD state.

However, AWD in this case (hereinafter also referred to as "transient AWD") is not the "AWD" illustrated in FIG. 2 that is used when the drive ECU 28 determines to select AWD as the running state (drive state). Rather this is used only for the purpose of transitioning from RWD to FWD. Otherwise stated, the AWD illustrated in FIG. 2 is what is selected based on the flowcharts of FIG. 3 and FIG. 4, while the transient AWD is what is used when it is determined to switch from RWD to FWD based on the flowcharts of FIG. 3 and FIG. 4. Note that the drive state may be changed based on at least one of the vehicle speed V, a vehicle speed change amount (time derivative of the vehicle speed V), the accelerator opening angle θap, an opening angle change amount (time derivative of the accelerator opening angle θap), and the yaw rate Yr.

During transient AWD, for example, a sum total of the front wheel driving force Ff and the rear wheel driving force Fr (hereinafter referred to as "total driving force Ftotal") remains constant. Accordingly, switching from RWD to FWD can be carried out without changing the behavior of the vehicle 10, and the uneasy feeling of the driver due to this behavior change that accompanies this switch can be prevented.

Alternatively, during transient AWD, the total driving force Ftotal can be changed by controlling, for example, at least one of the accelerator opening angle θap, the opening change amount, or the vehicle speed change amount. When, for example, the accelerator opening angle θap is large, the opening change amount is a positive value, or the vehicle speed change amount is a positive value, the total driving force Ftotal may be increased, while when the accelerator opening angle θap is small, the opening change amount is a negative value, in the vehicle speed change amount is a negative value, the total driving, force Ftotal may be reduced.

A similar process can be performed when switching from FWD to RWD as that which was performed when switching from RWD to FWD. In other words, transient AWD intervenes when switching from RWD to FWD. Further, during transient AWD, the total driving force Ftotal can be controlled.

When switching from FWD to AWD, for example, the rear wheel driving force Fr is increased while bolding the front wheel driving three Ff in a constant state to thereby increase the total driving force Ftotal. Alternatively, the rear wheel driving force Fr is increased while reducing the front wheel driving force Ff to thereby hold constant or increase the total driving force Ftotal. Alternatively, the rear wheel driving force Fr is increased while increasing the front wheel driving force Ff to thereby increase the total driving force Ftotal.

In a similar manner, when switching from RWD to AWD, for example, the front wheel driving force Ff is increased, while holding the rear wheel driving force Fr in a constant state to thereby increase the total driving force Ftotal. Alternatively, the front wheel driving force Ff is increased while reducing the rear wheel driving force Fr to thereby hold constant or increase the total driving force Ftotal. Alternatively, the front wheel driving force Ff is increased while increasing the rear wheel driving force Fr to thereby increase the total driving force Ftotal.

When switching from AWD to FWD, for example, the rear wheel driving force Fr is reduced while holding the front wheel driving force Ff in a constant state to thereby reduce the total driving force Ftotal. Alternatively, the rear wheel driving force Fr is reduced while increasing the front wheel driving force Ff to thereby hold constant or reduce the total driving force Ftotal. Alternatively, the rear wheel driving force Fr is reduced while reducing the front wheel driving force Ff to thereby reduce the total driving force Ftotal.

In a similar manner, when switching from AWD to RWD, for example, the front wheel driving force Ff is reduced while holding the rear wheel driving force Fr in a constant state to thereby reduce the total driving force Ftotal. Alternatively, the front wheel driving force Ff is reduced while increasing the rear wheel driving force Fr to thereby hold constant or reduce the total driving force Ftotal. Alternatively, the front wheel driving force Ff is reduced while reducing the rear wheel driving force Fr to thereby reduce the total driving force Ftotal.

As described above, according to this embodiment, when the lateral G force is not less than the drive state switch prohibiting threshold value G1 (first lateral G force threshold value G1) (S35 of FIG. 7: No), switching of the drive state is prohibited (S4 of FIG. 3: Yes→S5). The first lateral G force threshold value G1 sets the divergence reference value Gref that is the smaller value of the first divergence generation value Gdiv 1 (first lateral G force) and the second divergence generation value Gdiv 2 (second lateral G force) as a reference (see FIG. 5, FIG. 6, FIG. 8, and FIG. 9). Therefore, unintended sudden changes in the turning radius ratio R/R0 that accompany switching the drive state can be suppressed.

Particularly, because the first lateral G force threshold value G1 sets the divergence reference value Gref that is the smaller value of the first divergence generation value Gdiv 1 (first lateral G force) and the second divergence generation value Gdiv 2 (second lateral G force) as a reference, unintended sudden changes can be suppressed even when switching is performed for any of the drive states.

Accordingly, a drive state can be favorably selected.

In this embodiment, the first lateral G force threshold value G1 is set as a value equivalent to the divergence reference value Gref, and when the lateral G force has increased to the first lateral G force threshold value G1, the ECU 28 prohibits switching of the drive state (S4 of FIG. 3: Yes) and also sets the drive state to AWD (S5). Accordingly, because switching the drive state is prohibited at a stage where the lateral G force is equivalent to the divergence reference value Gref, unintended sudden changes can be more surely suppressed.

In this embodiment, when the lateral G force is smaller than the first lateral G force threshold value G1 (S35 of FIG. 7: Yes, S4 of FIG. 3: No), when the vehicle 10 is at the low speed (S10 of FIG. 4: Yes), and when a drive state (RWD) of only the rear motors 16 and 18 is used (S11 of FIG. 4) and the lateral G force has increased to the first lateral G force threshold value G1 (S35 of FIG. 7: No, S4 of FIG. 3: Yes), AWD is set (S5 of FIG. 3).

According to the above, when the lateral G force is small, a drive state (RWD) of only the rear motors 16 and 18 is in effect from a perspective of energy efficiency, and when the lateral G force is large, AWD is in effect from a perspective of drivability and operating stability of the vehicle 10, and therefore, the energy efficiency of the vehicle 10 and the driving performance of the vehicle 10 can be improved.

In this embodiment, when it is determined by the ECU 28 (electric motor determiner) that the rear motors 16 and 18 are unable to drive (S2 of FIG. 3: No), FWD is used when the lateral G force has increased to the first lateral G force threshold value G1 (S17 of FIG. 3). Accordingly, it becomes possible to prevent a mode change to a drive state (RWD or AWD) that includes the rear motors 16 and 18 while the rear motors 16 and 18 are in an undrivable condition.

In this embodiment, when the drive state is RWD, the engine 12 is stopped without allowing idling, and when the lateral G force has increased to the second lateral G force threshold value G2 that is smaller than the first lateral G force threshold value G1 (S38 of FIG. 7: No, S6 of FIG. 3: Yes), the engine 12 is started by switching from RWD to AWD (S7 of FIG. 3). Accordingly, it is possible to run the engine 12 at a constant level until the lateral G force reaches the first lateral G force threshold value G1 even when in RWD. Therefore, transition from RWD to AWD can be performed smoothly.

In this embodiment, the first lateral G force threshold value G1 is changed based on the accelerator opening angle θap (S32 of FIG. 7). Accordingly, the first lateral G force threshold value G1 can be more appropriately set.

In this embodiment, the first lateral G force threshold value G1 is stored in advance in the memory 44 of the ECU 28. Accordingly, while the vehicle 10 is running, identifying the first divergence generation value Gdiv 1 (first lateral G force) and the second divergence generation value Gdiv 2 (second lateral G force) and calculating the first lateral G force threshold value G1 based on a comparison of these is not necessary, and calculation of a first lateral G force threshold value G1 can be done quickly.

Note that the present disclosure is not limited to the embodiments given above and it is obvious that various configurations may be adopted based on the contents described in the specification. For example, the following configuration may be adopted.

The vehicle 10 is described in the embodiment given above as a four wheel passenger vehicle (FIG. 1), however the vehicle is not limited to this from the perspective of divergence of the turning radius ratio R/R0 in each drive state for the first divergence generation value Gdiv 1 (first lateral G force) or the second divergence generation value Gdiv 2 (second lateral G force), as long as the vehicle can switch between at least any of two of FWD, RWD, and AWD. For example, the vehicle may be any of a two wheel motorized vehicle, a three wheel motorized vehicle, and a six wheel motorized vehicle.

In the embodiment given above, the vehicle 10 had one engine 12 and three traction motors 14, 16, and 18 as drive sources, but the drive sources are not limited to this combination. For example, the vehicle 10 may have one or a plurality of traction motors for the front wheels 32 and may have one or a plurality of traction motors for the rear wheels 36 as drive sources. For example, only a single traction motor may also be used for the front wheels 32 and for the rear wheels 36. In this case, the driving force may be distributed to the left and right wheels using a differential gear. In addition, a configuration is also possible that allocates individual traction motors (including a so-called in wheel motor) to each of the wheels respectively.

Figure 11:
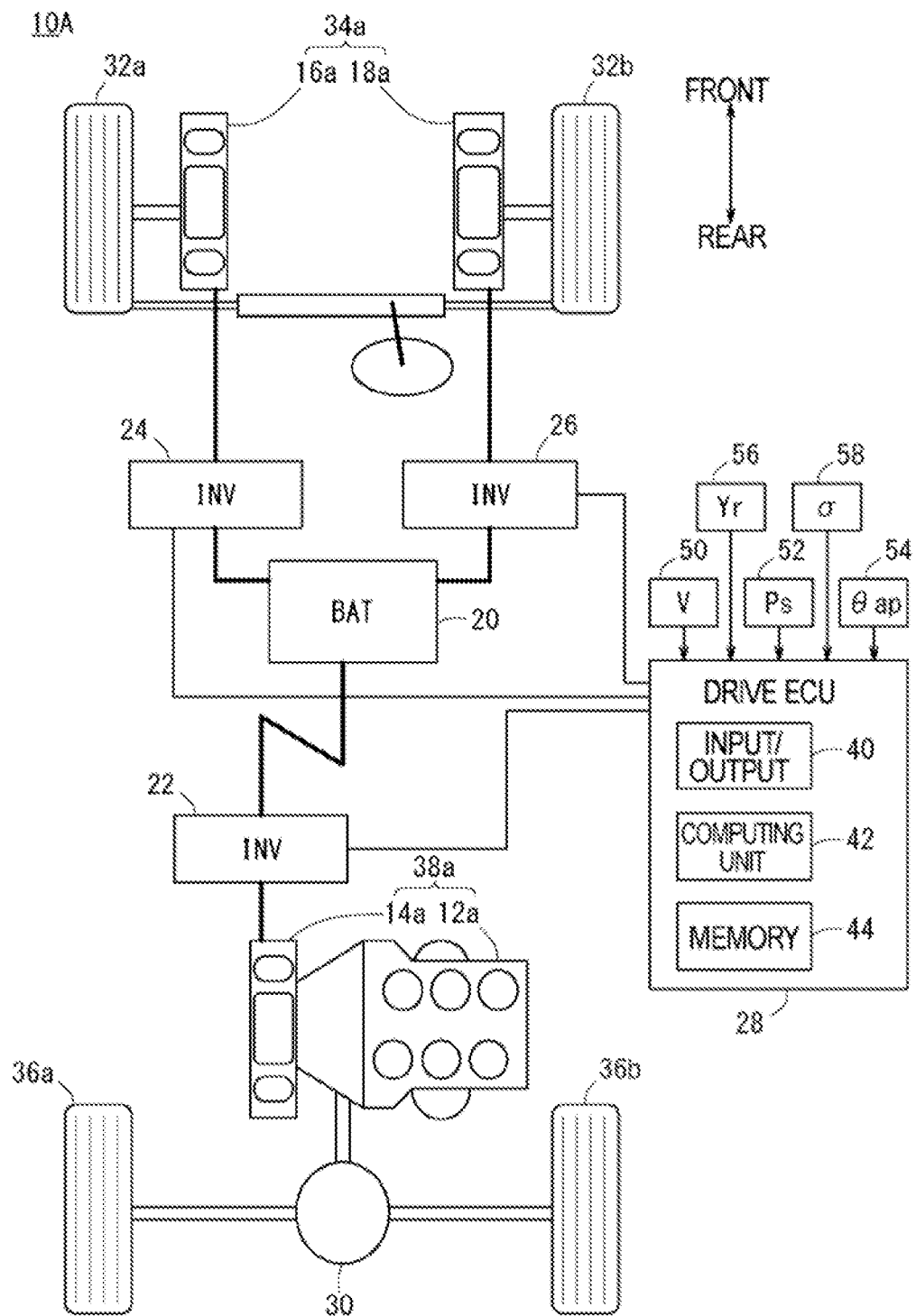
FIG. 11 is a schematic configuration of a drive train and a periphery thereof of a vehicle according to a modified example of the present disclosure.

FIG. 11 is a schematic configuration of a drive train and a periphery thereof of a vehicle according to a modified example of the present disclosure. In vehicle 10A, the configuration of the front wheel drive device 34 and the rear wheel drive device 38 of the vehicle 10 that relates to the embodiment given above is reversed. In other words, the front wheel drive device 34a of vehicle 10A is provided with second and third traction motors 16a and 18a disposed on the front side of vehicle 10A. In addition, the rear wheel drive device 33a of vehicle 10A is provided with an engine 12a and a first traction motor 14a disposed in-line at the rear side of the vehicle 10A.

In the embodiment given above and in the modified example of FIG. 11, the front wheels 32 are the steering wheels and the rear wheels 36 are non-steering wheels, however, a configuration is possible in which both the front wheels 32 and the rear wheels 36 are steering wheels, and a configuration is also possible in which the rear wheels 36 are the steering wheels and the front wheels 32 are non-steering wheels.

In the embodiment given above, the first, second, and third traction motors 14, 16, and 18 were three-phase AC brushless type motors, however, they are not limited to this. For example, the first, second, and third traction motors 14, 16, and 18 may be a three-phase AC brush type, a single phase AC type, or a DC type motor.

In the embodiment given above, the first, second, and third traction motors 14, 16, and 18 had power supplied from a high tension battery 20, however, in addition to this, power may be supplied from fuel-cell.

In the embodiment given above, switching of the drive state was performed using the flowcharts of FIG. 3 and FIG. 4, however, the switching method of the drive state is not limited to this. For example, switching may be based on at least one of the vehicle speed V, the vehicle speed change amount, the accelerator opening angle θap, the opening angle change amount, and the aw rate Yr. Alternatively, switching the running state (drive state) may be performed by any other suitable method known to those skilled in the art.

In the embodiment described above, switching is possible between FWD, RWD, and AWD as drive states of the vehicle 10, however, the vehicle is not limited to this from the perspective of divergence of the turning radius ratio R/R0 in each drive state for the first divergence generation value Gdiv 1 (first lateral G force) or the second divergence generation value Gdiv 2 (second lateral G force), as long as the vehicle can switch between at least any of two of these. For example, a configuration can be applied in which switching only between FWD and AWD (first switch) is possible or a configuration can be applied in which switching only between RWD and AWD (second switch) is possible.

In the embodiment given above, the lateral G force is not less than the first lateral G force threshold value G1 (S35 of FIG. 7: No), and when switching the drive state is prohibited (S37 of FIG. 7 and S4 of FIG. 3: Yes), the drive state is set to AWD (S5 of FIG. 3). However, the drive state selected when switching of the drive state is prohibited does not have to be limited to AWD. For example, the drive state selected when switching of the drive state is prohibited may be FWD or RWD. Alternatively, an identified drive state set in advance does not have to be selected, and the drive state can be set to the drive state that was selected at the time of the prohibiting of switching of the drive state (the drive state immediately prior to prohibiting).

In the embodiment given above, a value equivalent to the first divergence generation value Gdiv 1 was set as the first lateral G force threshold value G1 as the limit value for the turning radius ratio R/R0 for FWD, RWD, and AWD to begin to diverge, however, the first lateral G force threshold value G1 can be set to a value other than this. For example, the first lateral G force threshold value G1 may be set to a value that is smaller than the first divergence generation value Gdiv 1 at the point that actual divergence begins, from the perspective of surely prohibiting switching of the drive state. Alternatively, from the perspective of suppressing the divergence amount to less than a predetermined value, the first lateral G force threshold value G1 can be set to a value that is slightly larger than the first divergence generation value Gdiv 1.

In the embodiment given above, the drive state switch prohibiting threshold value G1 is the value of the lateral G force, however the value is not limited to this as long as it is a value related to the lateral G force (lateral acceleration related value), even if the value is not that of the lateral G force itself. For example, considering that the lateral G force is calculated in equation (2) given above as the product of the yaw rate Yr and the vehicle speed V (lateral G force=Yr×V), a similar effect can be produced by dividing the first lateral G force threshold value G1 by the vehicle speed V (G1/V) and comparing the result to the yaw rate Yr, or by dividing first lateral G force threshold value G1 by the yaw rate Yr (G1/Yr) and comparing the result to the vehicle speed V. In other words, instead of a value that directly expresses the lateral G force, a value that indirectly expresses the lateral G force (yaw rate Yr or vehicle speed V in the example given above) may be compared to a predetermined threshold value (a value that indirectly expresses the first lateral G force threshold value G1) which indicates essentially the same thing as the embodiment given above. The same can be said for the equation (1) given above.

In the embodiment given above, the first lateral G force threshold value G1 was switched based on the accelerator opening angle θap (see FIG. 5, FIG. 6, FIG. 8, and FIG. 9). However, other values may be used in addition to or in place of the accelerator opening angle θap, as long as the value is that of the turning radius ratio R/R0 that corresponds to switching of the drive state or a value similar to this that gives an effect of changing (diverging) the turning characteristic related value.

Figure 12:
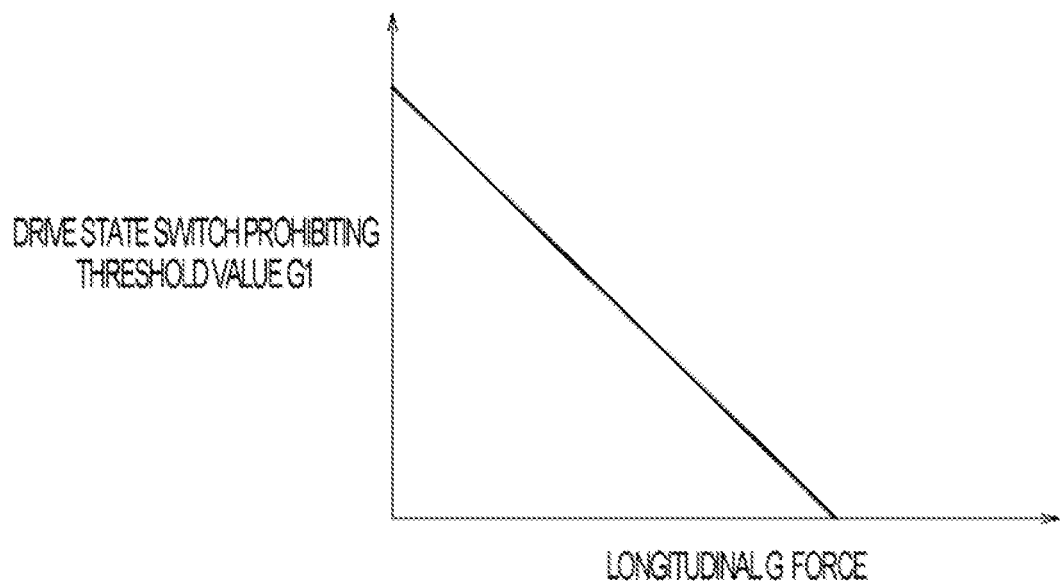
FIG. 12 is a diagram illustrating a first example of a relationship between longitudinal acceleration (hereinafter referred to as "longitudinal G force") and the drive state switch prohibiting threshold value.
Figure 13:
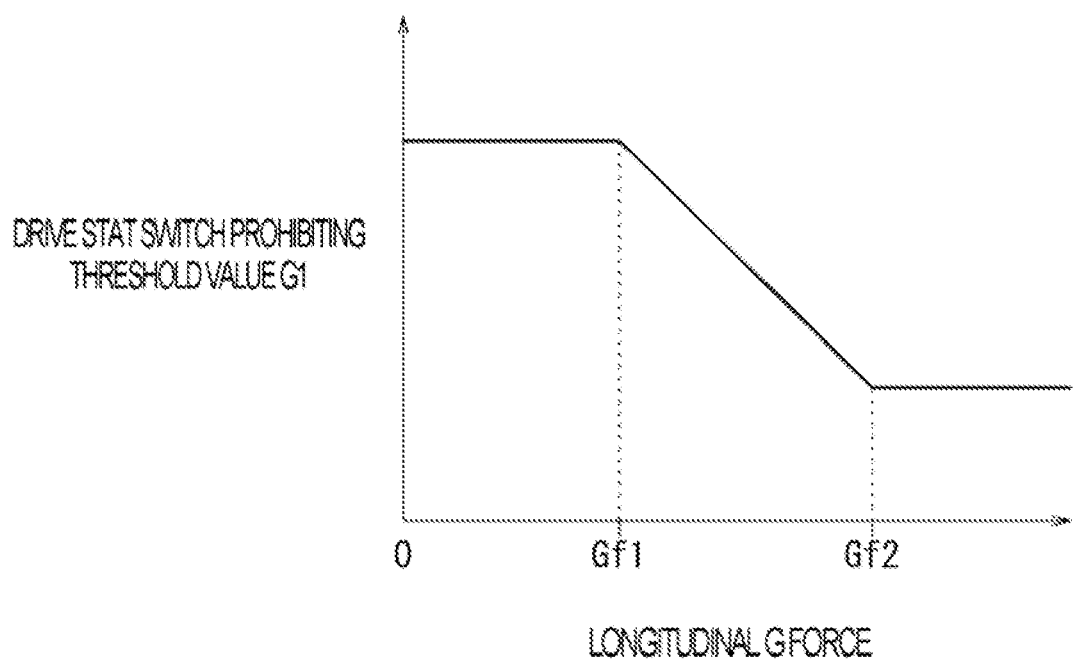
FIG. 13 is a diagram illustrating a second example of a relationship between longitudinal G force and the drive state switch prohibiting threshold value.

For example, as illustrated in FIG. 12 and FIG. 13, it is also possible to change the drive state switch prohibiting threshold value G1 (first lateral G force threshold value G1) based on the longitudinal acceleration (longitudinal G force). The longitudinal G force can be detected by for example, a longitudinal G force sensor not shown. In FIG. 12, the threshold value G1 decreases as the longitudinal G force increases.

In addition, in FIG. 13, the threshold value G1 is constant when the longitudinal G force is between 0 and Gf1. This is because it is considered that there is no essential meaning to changing the threshold value G1 when the longitudinal G force is in a low state (from 0 to Gf1). Further, the threshold value G1 decreases between Gf1 to Gf2. This is because, as described in reference to FIGS. 5 and 6 and the like, the first divergence generation value Gdiv 1 and the second divergence generation value Gdiv 2 that relate to the lateral G force get smaller as the longitudinal G force gets larger. In addition, the threshold value G1 remains constant when the longitudinal G force becomes greater than Gf2. This is because, for example, the threshold value G1 has reached a minimum value.

Figure 14:
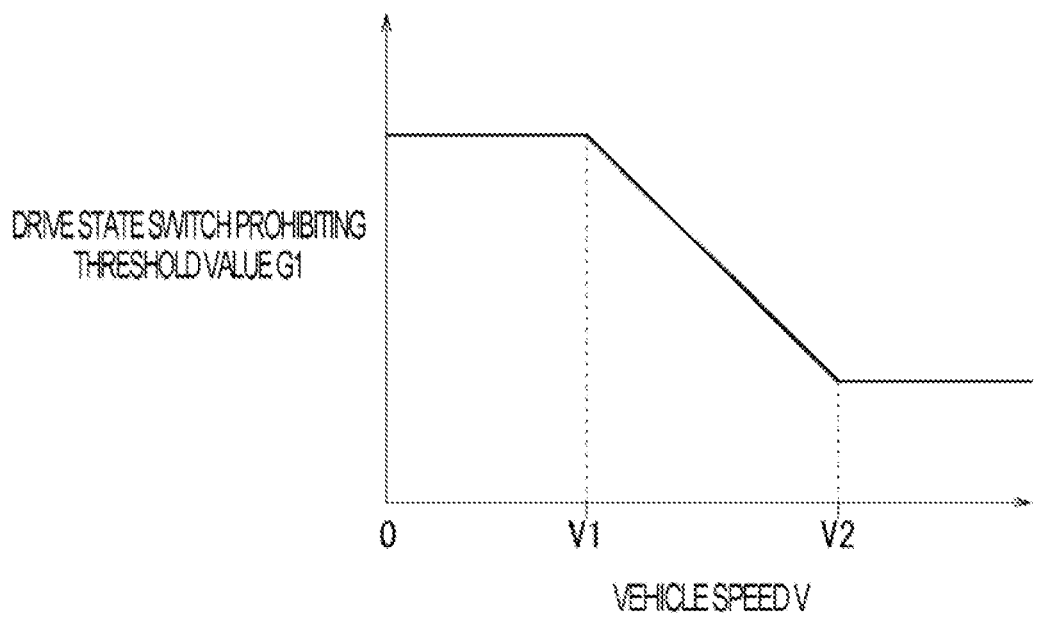
FIG. 14 is a diagram illustrating one example of a relationship between vehicle speed and the drive state switch prohibiting threshold value.

Alternatively, as illustrated in FIG. 14, the first lateral G force threshold value G1 can be changed based on the vehicle speed V. In FIG. 14, the threshold value G1 is constant when vehicle speed V is between 0 and V1. This is because it is considered that there is no essential meaning to changing the threshold value G1 when the vehicle speed V is in a low state (from 0 to V1). Further, threshold value G1 decreases between V1 and V2. This is because, as described in reference to FIGS. 5 and 6 and the like, the first divergence generation value Gdiv 1 and the second divergence generation value Gdiv 2 that relate to the lateral G force get smaller as the vehicle speed V gets larger. In addition, as the vehicle speed V becomes larger than V2, the threshold value G1 remains constant. This is because, for example, the threshold value G1 has reached a minimum value.

Alternatively, the first lateral G force threshold value G1 may be changed based on an acceleration intent related value (something other than the accelerator opening angle θap) that expresses an intent of the driver to accelerate. As an acceleration intent related value other than the accelerator opening angle θap, for example, a target driving force can be used that is set as a target value for the actual driving force of the engine 12 performed by various controls, such as a required value for the driving force (required driving force) for the engine 12 set according to the accelerator opening angle θap, as well as a feedback control, a limit control, or the like that is relative to such required driving force.

In addition, in a case where conditions at or above the first lateral G force threshold value G1 are severely restricted, for example, a fixed first lateral G force threshold value G1 may be used.

In the embodiment given above, the first lateral G force threshold value G1 sets the divergence reference value Gref as a reference from the smaller value of either the first divergence generation value Gdiv 1 and the second divergence generation value Gdiv 2. In other words, the first lateral G force threshold value G1 is used for switching the drive state regardless of the content of the switching.

However, as illustrated in FIG. 5 and FIG. 6, focusing on the fact that the first divergence generation value Gdiv 1 and the second divergence generation value Gdiv 2 are different values, the first lateral G force threshold value G1 can be made variable according to the switching content of the drive state. In other words, different first lateral G force threshold values G1 can be set according to the switching content of the drive state. For example, when switching between FWD, RWD, or AWD, the first divergence generation value Gdiv 1 can be the first lateral G force threshold value G1 and when switching between RWD and AWD, the second divergence generation value Gdiv 2 can also be the first lateral G force threshold value G1.

In the embodiment given above, a description was given in which the first lateral G force threshold value G1 is set from the perspective of comparing the first divergence generation value Gdiv 1 (first lateral G force) and the second divergence generation value Gdiv 2 (second lateral G force). However, setting the first lateral G force threshold value G1 by focusing on the amount of change of the turning radius ratio R/R0 at the time that the drive state is switched is essentially the same.

In other words the first lateral G force threshold value G1 may be set based on the smaller value of either a first amount of change that is a predicted amount of change of the turning radius ratio R/R0 when switching between FWD and AWD (first switch) in a state where the lateral G force exceeds the first lateral G force threshold value G1, or a second amount of change that is a predicted amount of change of the turning radius ratio R/R0 when switching between RWD and AWD (second switch). Note that the first switch and the second switch referred to here includes the transient AWD at the time of switching between FWD and RWD. Alternatively, when setting the first lateral G force threshold value G1 for each switching content of the drive state, the first lateral force threshold value G1 can be set according to the first amount of change and the second amount of change respectively.

In the embodiment given above, the first lateral G force threshold value G1 is stored in the memory 44 of the ECU 28 in advance, however, the first lateral G force threshold value G1 can also be calculated by consecutive calculations while driving. In this case, for example, the relationship between the lateral G force and the turning radius ratio R/R0 is stored for each drive state, and the amount of change in the turning radius ratio R/R0 can be used to calculate a lateral G force that is at or above a predetermined value as the first lateral G force threshold value G1.

In the embodiment given above, the turning radius ratio R/R0 was used as a turning characteristic related value that generates divergence in relation with the lateral G force at the time of switching the drive state, but the first lateral G force threshold value G1 and the second lateral G force threshold value G2 may be set based on other turning characteristic values (for example, the actual turning radius R itself or the slip ratio of any of the wheels).

In the embodiment given above, the second lateral G force threshold value G2 was set based on the accelerator opening angle θap, however, this value is not limited to this, as long as it can be determined that there is a high likelihood in the future that the lateral G force will be at or above the first lateral G force threshold value G1 and the engine 12 can remain started. For example, the second lateral G force threshold value G2 can be set, in a similar manner to the first lateral G force threshold value G1, based on other values (longitudinal G force or vehicle speed V) in addition to or in place of the accelerator opening angle θap. In addition, in a case where conditions at or above the first lateral G force threshold value G1 are severely restricted, for example, a fixed second lateral G force threshold value G2 may be used, in a similar manner to the first lateral G force threshold value G1.

Alternatively, the threshold value G2 can also be set based on the threshold value G1. Here, if it is assumed that there will be a small amount of change in the lateral G force (time derivative) when the longitudinal G force is small, then when the longitudinal G force is small, the threshold value G2 may be set to have a small difference with the threshold value G1, and when the longitudinal G force is large, the threshold value G2 may be set to have a large difference with the threshold value G1.

In step S2 of FIG. 3, a determination is made of whether the rear motors 16 and 18 can drive based on the temperature of the rear motors 16 and 18, the occurrence of an abnormality in the rear motors 16 and 18, and the SOC of the battery 20, however, the determination is not limited to this, as long as a determination can be made of whether the rear motors 16 and 18 can drive. For example, a determination may be made by any one or two of the temperature of the rear motors 16 and 18, the occurrence of an abnormality in the rear motors 16 and 18, and the SOC of the battery 20.

Alternatively, other indicators may also be used in addition to or in place of a portion or all of the above indicators. For example, a level of deterioration (number of charges, use period, or the like) of the battery 20 may be used.

Note that in the flowchart of FIG. 4, when the vehicle 10 is at a high vehicle speed (S12: No). FWD is selected and the rear motors 16 and 18 do not drive. Therefore, essentially, a decision is made whether the rear motors 16 and 18 can drive depending on vehicle speed V.

In the embodiment given above, when RWD is selected, it is emphasized that the engine 12 is stopped without allowing idling except in step S7 of FIG. 3 and when generating electric power at the first motor 14 by the driving force of the engine 12. However, the engine 12 can also be made to stand by in an idling state at times other than step S7 of FIG. 3 and when generating electric power.

It will be understood that based on the foregoing description, the divergence reference value Gref, or the first threshold value, may be the value at which the drive state control device prohibits switching of the drive state of the front wheels and the rear wheels. The first threshold value can be determined considering factors such as the lateral acceleration acting on the vehicle, a turning characteristic related value such as turning radius ratio R/R0, and the drive state of the front wheels and the rear wheels.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A system for controlling a vehicle, comprising:
a front wheel drive device that drives front wheels, a rear wheel drive device that drives rear wheels separately and independently from the front wheel drive device, and a drive state control device that controls the front wheel drive device and the rear wheel drive device to control a drive state of the front wheels and the rear wheels;
wherein the drive state control device performs a first switch to switch between a front wheel independent drive state that drives only the front wheels and a combined drive state that drives both the front wheels and the rear wheels, and a second switch to switch between a rear wheel independent drive state that drives only the rear wheels and the combined drive state; and furthermore wherein:
the drive state control device prohibits the first switch and the second switch when a lateral acceleration related value related to a lateral acceleration acting on the vehicle exceeds a first threshold value; and
the drive state control device sets the first threshold value as a reference for a divergence reference value for whichever value of a first lateral acceleration related value and a second lateral acceleration related value is smaller, when a first correlation is defined as a correlation between the lateral acceleration related value and a turning characteristic related value in the front wheel independent drive state, a second correlation is defined as a correlation between the lateral acceleration related value and the turning characteristic related value in the rear wheel independent drive state, a third correlation is defined as a correlation between the lateral acceleration related value and the turning characteristic related value in the combined drive state, while at the same time, the first lateral acceleration related value is defined as the lateral acceleration related value when the turning characteristic related value in the first correlation and the turning characteristic related value in the third correlation diverge by a first predetermined value or greater, and the second lateral acceleration related value is defined as the lateral acceleration related value when the turning characteristic related value in the second correlation and the turning characteristic related value in the third correlation diverge by a second predetermined value or greater.

2. The system for controlling a vehicle according to claim 1, wherein the first threshold value is set as a value of not more than the divergence reference value, and when the lateral acceleration related value has increased to the first threshold value, the drive state control device prohibits the first switch and the second switch, and fixes the drive state of the vehicle in a state that has been preset from among the front wheel independent drive state, the rear wheel independent drive state, or the combined drive state.

3. The system for controlling a vehicle according to claim 2, wherein a first drive device of either the front wheel drive device or the rear wheel drive device includes an internal combustion engine and a second drive device includes an electric motor.

4. The system for controlling a vehicle according to claim 3, wherein the drive state of only the second drive device is used when the lateral acceleration related value is smaller than the first threshold value, and the combined drive state is set when the lateral acceleration related value has increased to the first threshold value.

5. The system for controlling a vehicle according to claim 3, wherein the vehicle comprises an electric motor determiner that determines that the electric motor is unable to drive, and when it is determined, by the electric motor determiner that the electric motor is unable to drive, the drive state of only the first drive device is used, even if the lateral acceleration related value has increased to the first threshold value.

6. The system for controlling a vehicle according to claim 5, wherein the electric motor determiner determines the inability to drive based on a temperature of the electric motor, an occurrence of an abnormality in the electric motor, a state of power supply availability of a power source that supplies power to the electric motor, or a vehicle speed.

7. The system for controlling a vehicle according to claim 4, wherein the internal combustion engine is stopped without allowing idling in the drive state of only the second drive device and the internal combustion engine is started when the lateral acceleration related value has increased to a second threshold value that is smaller than the first threshold value.

8. The system for controlling a vehicle according to claim 1, wherein the first threshold value is changed based on at least one of the following: a longitudinal acceleration acting on the vehicle, a vehicle speed, or an acceleration intent related value that indicates an intent of the driver to accelerate.

9. The system for controlling a vehicle according to claim 1, wherein the first threshold value is stored in advance in a memory.

10. A system for controlling a vehicle, comprising:
a front wheel drive device that drives front wheels, a rear wheel drive device that drives rear wheels separately and independently from the front wheel drive device, and a drive state control device that controls the front wheel drive device and the rear wheel drive device to control a drive state of the front wheels and the rear wheels;
wherein the drive state control device performs a first switch to switch between a front wheel independent drive state that drives only the front wheels and a combined drive state that drives both the front wheels and the rear wheels, and a second switch to switch between a rear wheel independent drive state that drives only the rear wheels and the combined drive state, and furthermore wherein:
the drive state control device prohibits the first switch and the second switch when a lateral acceleration related value related to as lateral acceleration, acting on the vehicle exceeds a first threshold value; and
wherein the first threshold value is determined considering the lateral acceleration acting on the vehicle, a turning characteristic related value, and the drive state of the front wheels and the rear wheels.

11. The system for controlling a vehicle according to claim 10, wherein the drive state of the front wheels and the rear wheels includes the front wheel independent drive state, the rear wheel independent drive state, and the combined drive state.

12. The system for controlling a vehicle according to claim 10, wherein the turning characteristic related value comprises a turning radius ratio.

13. The system for controlling a vehicle according to claim 10, wherein the drive state control device sets the first threshold value based on the smaller of a first lateral acceleration related value and a second lateral acceleration related value.

14. The system for controlling a vehicle according to claim 10, wherein the first threshold value is determined by correlating the lateral acceleration related value and the turning characteristic related value with each of the front wheel independent drive state, the rear wheel independent drive state and the combined drive state.

15. A method for controlling a vehicle, the vehicle including as front wheel, drive device that drives front wheels, a rear wheel drive device that drives rear wheels separately and independently from the front wheel drive device, and a drive state control device that controls the front wheel drive device and the rear wheel drive device to control a drive state of the front wheels and the rear wheels between a front wheel independent drive state that drives only the front wheels, a rear wheel independent drive state that drives only the rear wheels and a combined drive state that drives both the front wheels and the rear wheels; the method comprising:

allowing the drive state control device to switch between the front wheel independent drive state, the rear wheel independent drive state and the combined drive state;

prohibiting the drive state control device from switching the drive state when a lateral acceleration related value exceeds a first threshold; and setting the first threshold based on a lateral acceleration acting on the vehicle, a turning characteristic related value, and the drive state of the front wheels and the rear wheels.

16. The method of claim 15, wherein setting the first threshold further comprises:

defining a first correlation between the lateral acceleration related value and the turning characteristic related value in the front wheel independent drive state;

defining a second correlation between the lateral acceleration related value and the turning characteristic related value in the rear wheel independent drive state; and defining a third correlation between the lateral acceleration related value and the turning characteristic related value in the combined drive state.

17. The method of claim 16, further comprising:

defining a first lateral acceleration related value as the lateral acceleration related value when the turning characteristic related value in the first correlation and the turning characteristic related value in the third correlation diverge by a first predetermined value or greater.

18. The method of claim 17, further comprising:

defining a second lateral acceleration related value as the lateral acceleration related value when the turning characteristic related value in the second correlation and the turning characteristic related value in the third correlation diverge by a second predetermined value or greater.

19. The method of claim 18, further comprising:

setting the first threshold based on whichever value of the first lateral acceleration related value and the second lateral acceleration related value is smaller.

* * * * *